(12) United States Patent
Frost et al.

(10) Patent No.: US 9,967,191 B2
(45) Date of Patent: May 8, 2018

(54) RECEIVER-SIGNALED ENTROPY LABELS FOR TRAFFIC FORWARDING IN A COMPUTER NETWORK

(71) Applicant: Cisco Technology, Inc., San Jose, CA (US)

(72) Inventors: Dan Frost, Middlesex (GB); Stewart Frederick Bryant, Surrey (GB)

(73) Assignee: Cisco Technology, Inc., San Jose, CA (US)

( * ) Notice: Subject to any disclaimer, the term of this patent is extended or adjusted under 35 U.S.C. 154(b) by 302 days.

(21) Appl. No.: 13/950,452

(22) Filed: Jul. 25, 2013

(65) Prior Publication Data

US 2015/0029849 A1 Jan. 29, 2015

(51) Int. Cl.
*G01R 31/08* (2006.01)
*H04L 12/803* (2013.01)
*H04L 12/723* (2013.01)

(52) U.S. Cl.
CPC ............ *H04L 47/125* (2013.01); *H04L 45/50* (2013.01)

(58) Field of Classification Search
CPC .............................. H04L 47/125; H04L 45/50
See application file for complete search history.

(56) References Cited

U.S. PATENT DOCUMENTS

| | | |
|---|---|---|
| 7,843,823 B2 | 11/2010 | Lev-Ran et al. |
| 7,940,930 B2 | 5/2011 | Shen-Orr et al. |
| 8,270,495 B2 | 9/2012 | Chou et al. |
| 2001/0043585 A1* | 11/2001 | Hummel ................. H04L 47/10 370/351 |
| 2002/0071389 A1* | 6/2002 | Seo .......................... H04L 45/00 370/232 |
| 2002/0083174 A1* | 6/2002 | Hayashi .................. H04L 47/11 709/225 |
| 2002/0112072 A1* | 8/2002 | Jain ......................... H04L 45/00 709/239 |

(Continued)

OTHER PUBLICATIONS

Bryant, et al., "Flow-Aware Transport of Pseudowires Over an MPLS Packet Switched Network", Internet Engineering Task Force, Request for Comments 6391, Nov. 2011, 19 pages, The Internet Engineering Task Force Trust.

(Continued)

*Primary Examiner* — Gregory Sefcheck
*Assistant Examiner* — Jael Ulysse
(74) *Attorney, Agent, or Firm* — Parker Ibrahim & Berg LLP; James M. Behmke; Stephen D. LeBarron (57) ABSTRACT

In one embodiment, a receiver device determines that it accepts flow entropy, and accordingly determines a set of entropy labels the receiver device is accepting. After transmitting the set of entropy labels from the receiver device to one or more sender devices, the receiver device may then receive packets from the one or more sender devices with selected particular entropy labels from the set of entropy labels. In another embodiment, a sender device receives from a receiver device a set of entropy labels the receiver device is accepting. As such, when determining a packet to forward to the receiver device with flow entropy, the sender device may select a particular entropy label from the set of entropy labels for that receiver device, and transmits the packet device to the receiver device with the selected particular entropy label.

20 Claims, 7 Drawing Sheets

(56) References Cited

U.S. PATENT DOCUMENTS

| | | | |
|---|---|---|---|
| 2003/0016624 A1* | 1/2003 | Bare | H04L 29/12009 370/217 |
| 2003/0053414 A1* | 3/2003 | Akahane | H04L 45/00 370/216 |
| 2003/0142669 A1* | 7/2003 | Kubota | H04L 45/00 370/389 |
| 2004/0213228 A1* | 10/2004 | Tingle | H04L 12/462 370/389 |
| 2004/0264505 A1* | 12/2004 | Miki | H04L 49/3009 370/469 |
| 2005/0008015 A1* | 1/2005 | Meda | H04L 47/2458 370/392 |
| 2005/0125490 A1* | 6/2005 | Ramia | H04L 45/50 709/202 |
| 2005/0262264 A1* | 11/2005 | Ando | H04L 45/00 709/233 |
| 2005/0265308 A1* | 12/2005 | Barbir | H04L 12/4641 370/351 |
| 2006/0039364 A1* | 2/2006 | Wright | H04L 41/0893 370/352 |
| 2006/0092952 A1* | 5/2006 | Boutros | H04L 41/06 370/400 |
| 2006/0126496 A1* | 6/2006 | Filsfils | H04L 45/02 370/216 |
| 2006/0164975 A1* | 7/2006 | Filsfils | H04L 45/00 370/225 |
| 2006/0193248 A1* | 8/2006 | Filsfils | H04L 45/04 370/216 |
| 2006/0221813 A1* | 10/2006 | Scudder | H04L 45/02 370/216 |
| 2006/0221867 A1* | 10/2006 | Wijnands | H04L 45/02 370/255 |
| 2007/0121486 A1* | 5/2007 | Guichard | H04L 45/02 370/216 |
| 2007/0121615 A1* | 5/2007 | Weill | H04L 12/4633 370/389 |
| 2007/0177525 A1* | 8/2007 | Wijnands | H04L 12/18 370/254 |
| 2007/0217415 A1* | 9/2007 | Wijnands | H04L 12/1836 370/390 |
| 2007/0286204 A1* | 12/2007 | Ould-Brahim | H04L 12/4633 370/395.5 |
| 2008/0031263 A1* | 2/2008 | Ervin | H04L 12/4641 370/397 |
| 2008/0151905 A1* | 6/2008 | Krzanowski | H04L 41/5009 370/395.5 |
| 2008/0225741 A1* | 9/2008 | Venkateswaran | H04L 43/50 370/252 |
| 2009/0141721 A1* | 6/2009 | Filsfils | H04L 45/50 370/392 |
| 2009/0279431 A1* | 11/2009 | Baruah | H04L 45/24 370/235 |
| 2009/0285117 A1* | 11/2009 | Wang | H04L 41/142 370/253 |
| 2010/0040061 A1* | 2/2010 | McGuire | H04L 12/4633 370/392 |
| 2010/0214913 A1* | 8/2010 | Kompella | H04L 45/125 370/230 |
| 2010/0238788 A1* | 9/2010 | Boutros | H04L 43/0811 370/216 |
| 2011/0164503 A1* | 7/2011 | Yong | H04L 69/22 370/237 |
| 2012/0106347 A1* | 5/2012 | Allan | H04L 12/4625 370/238 |
| 2013/0033994 A1 | 2/2013 | Parekh et al. | |
| 2013/0077673 A1 | 3/2013 | Puri | |
| 2013/0107712 A1* | 5/2013 | Allan | H04L 45/24 370/235 |
| 2013/0121150 A1 | 5/2013 | Sajassi et al. | |
| 2013/0286846 A1* | 10/2013 | Atlas | H04L 45/34 370/236 |
| 2013/0301472 A1* | 11/2013 | Allan | H04L 45/66 370/254 |
| 2013/0336315 A1* | 12/2013 | Guichard | H04L 12/4645 370/389 |

OTHER PUBLICATIONS

Kompella, et al., "The Use of Entropy Labels in MPLS Forwarding", Network Working Group, Internet Draft, draft-ietf-mpls-entropy-label-06, Sep. 2012, 24 pages, The Internet Engineering Task Force Trust.

* cited by examiner

__NOTOC__
RECEIVER-SIGNALED ENTROPY LABELS FOR TRAFFIC FORWARDING IN A COMPUTER NETWORK

TECHNICAL FIELD

The present disclosure relates generally to computer networks, and, more particularly, to entropy labels for traffic forwarding in a computer network.

BACKGROUND

Entropy labels are "random" label values included in a header field (e.g., an Internet Protocol (IP) header or a multi-protocol label switching (MPLS) label stack) of a packet to facilitate Equal Cost Multipath (ECMP) based load-balancing ("flow entropy"). Without entropy labels in a network where devices (e.g., label-switching routers (LSRs)) are performing ECMP solely on the basis of the header field, packets with the same forwarding information (e.g., header/label stack) will typically all follow the same path since most ECMP implementations use the forwarding information (e.g., header/label stack) as the input to hash-based load-balancing algorithms. When multiple flows have the same forwarding information this means they cannot be effectively load-balanced. Entropy labels solve this problem by giving the source router the ability to "tag" different flows with different entropy label values, resulting in different headers/label stacks for different flows and better ECMP load-balancing.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a receiver device determines that it accepts flow entropy, and accordingly determines a set of entropy labels the receiver device is accepting. After transmitting the set of entropy labels from the receiver device to one or more sender devices, the receiver device may then receive packets from the one or more sender devices with selected particular entropy labels from the set of entropy labels.

According to one or more additional embodiments of the disclosure, a sender device receives from a receiver device a set of entropy labels the receiver device is accepting. As such, when determining a packet to forward to the receiver device with flow entropy, the sender device may select a particular entropy label from the set of entropy labels for that receiver device, and transmits the packet device to the receiver device with the selected particular entropy label.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP), the User Datagram Protocol (UDP), or Real-time Transport Protocol (RTP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
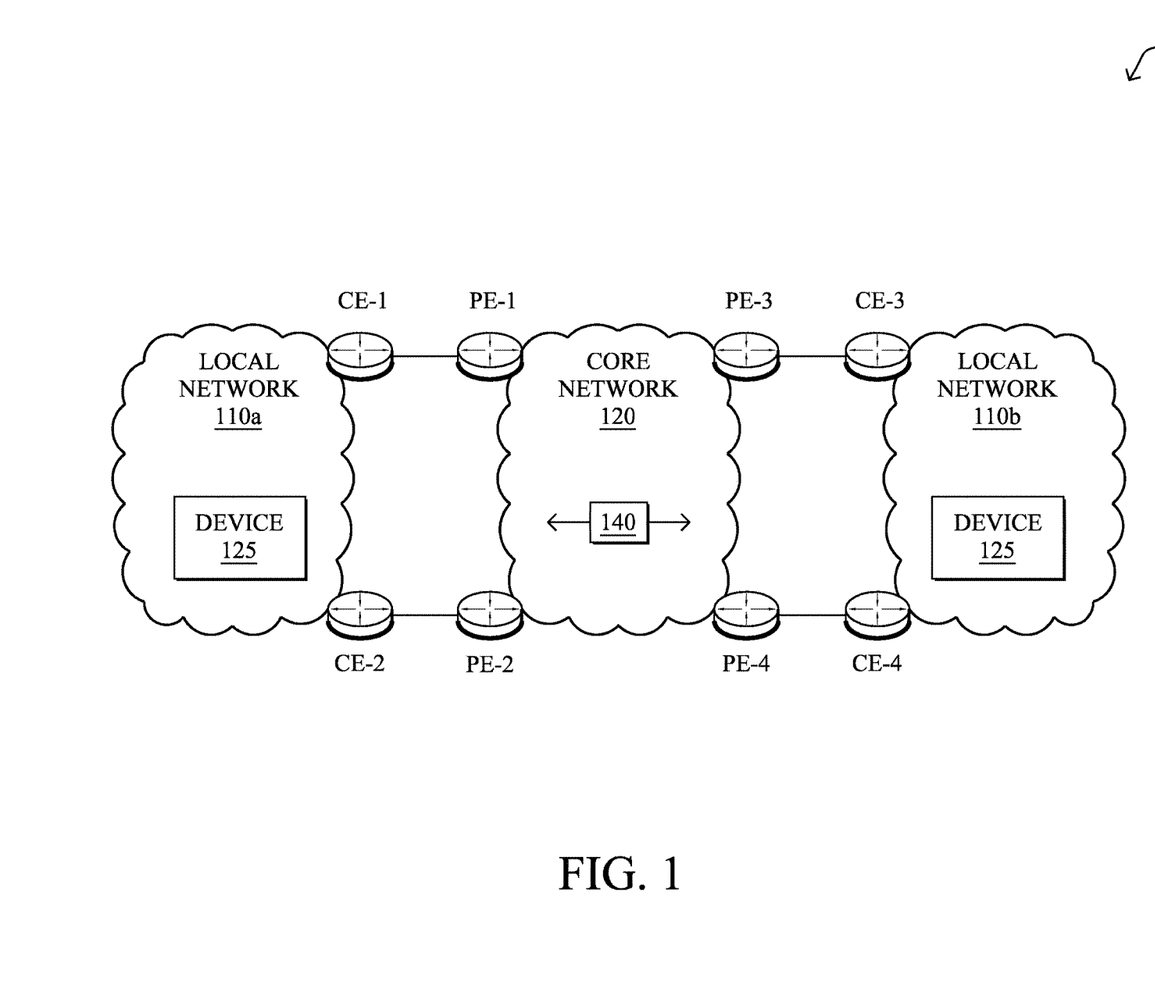
FIG. 1 illustrates an example computer network.

FIG. 1 is a schematic block diagram of an example computer network 100 illustratively comprising nodes/devices, such as a plurality of routers/devices interconnected by links or networks, as shown. For example, customer edge (CE) devices (e.g., CE1, CE2, CE3, and CE4) and provider edge (PE) devices (e.g., PE1, PE2, PE3, and PE4) may allow for communication between devices 125 within two or more local networks 110a,b via a core network 120 (e.g., a service provider network). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, across a WAN (e.g., the Internet), etc.

Data packets 140 may be exchanged among the network devices of the computer network 100 over links using predefined network communication protocols such as certain known wired protocols, wireless protocols, or other protocols where appropriate. In this context, a protocol consists of a set of rules defining how the devices interact with each other.

Figure 2:
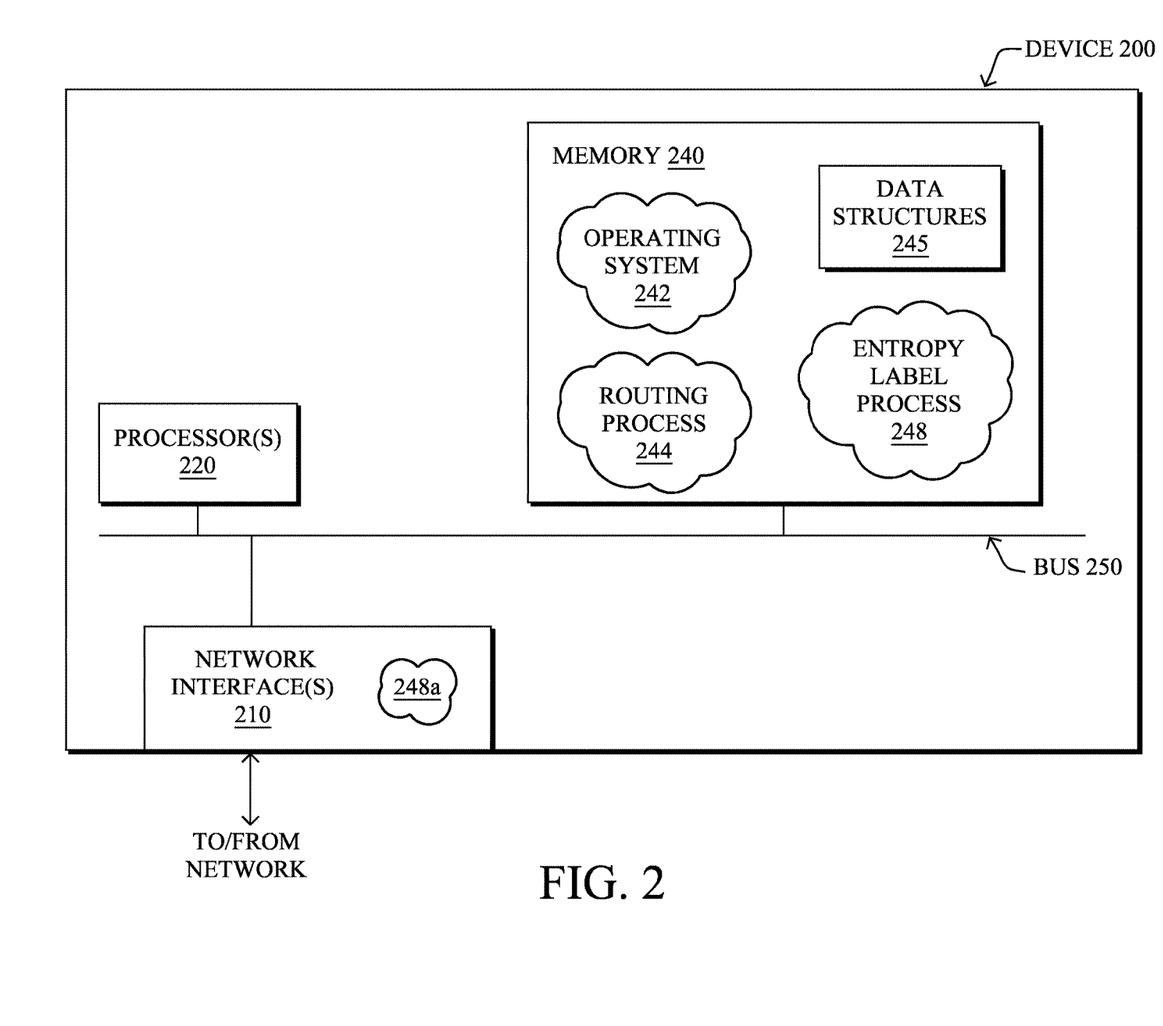
FIG. 2 illustrates an example network device/node.

FIG. 2 is a schematic block diagram of an example device 200 that may be used with one or more embodiments described herein, e.g., such as any of the PE devices or other devices as shown in FIG. 1 above. The device may comprise one or more network interfaces 210, one or more processors 220, and a memory 240 interconnected by a system bus 250. The network interface(s) 210 contain the mechanical, electrical, and signaling circuitry for communicating data over links coupled to the network 100. The network interfaces may be configured to transmit and/or receive data using a variety of different communication protocols. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor(s), functionally organizes the device by, inter alia, invoking operations in support of software processes and/or services executing on the device. These software processes and/or services may comprise routing process/services 244 and an illustrative entropy label process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

As noted above, entropy labels are "random" label values included in a header field (e.g., an IP header or an MPLS label stack) of a packet to facilitate Equal Cost Multipath (ECMP) based load-balancing. "Flow entropy", in particular, is the ability to direct packets (flows), having the same forwarding information (e.g., header field), over multiple paths through the network in a controlled (load-balanced) manner. Thus, for each packet that a device (e.g., an ingress device) transmits using flow entropy, an entropy label may be selected and placed within the packet to allow for per-flow load-balancing along multiple forwarding paths through the network (generally, though not necessarily, ECMP paths).

In other words, without entropy labels (where ECMP is performed solely on the basis of the header field), packets with the same header/label stack will typically all follow the same path since most ECMP implementations use the header/label stack as the input to hash-based load-balancing algorithms. When multiple flows have the same forwarding information (e.g., header field(s)) this means they cannot be effectively load-balanced. Entropy labels solve this problem by giving the source router the ability to "tag" different flows with different entropy label values, resulting in different label stacks for different flows and better ECMP load-balancing (better flow entropy).

There is ongoing work in the Internet Engineering Task Force (IETF) MPLS working group to standardize entropy label mechanisms. One such example is the IETF Proposed Standard Request for Comment (RFC) by Kompella et al., entitled "The Use of Entropy Labels in MPLS Forwarding" <RFC 6790>. The current working group direction is based on the receiver signaling its ability to handle entropy labels, the source choosing when and which entropy label values to insert at its discretion, and the receiver parsing packets with entropy labels based either on the stack position of the label or an explicit Entropy Label Indicator (ELI) label value included just above the entropy label in the label stack.

The techniques herein, on the other hand, provides for entropy label signaling that is accomplished by each receiver (e.g., edge router) advertising a set of entropy label values it is willing to process to all other edge routers. Source edge routers can then choose to include an entropy label from the set advertised by a specific receiver when sending labeled packets to that receiver.

Illustratively, the techniques described herein may be performed by hardware, software, and/or firmware, such as in accordance with the entropy label process 248/248a, which may contain computer executable instructions executed by the processor 220 (or independent processor of interfaces 210) to perform functions relating to the techniques described herein. For example, the techniques herein may be treated as extensions and/or alternatives to conventional protocols, such as various routing protocols (e.g., MPLS) or more specifically, entropy label protocols, and as such, may be processed by similar components understood in the art that execute those protocols, accordingly.

Figure 3:
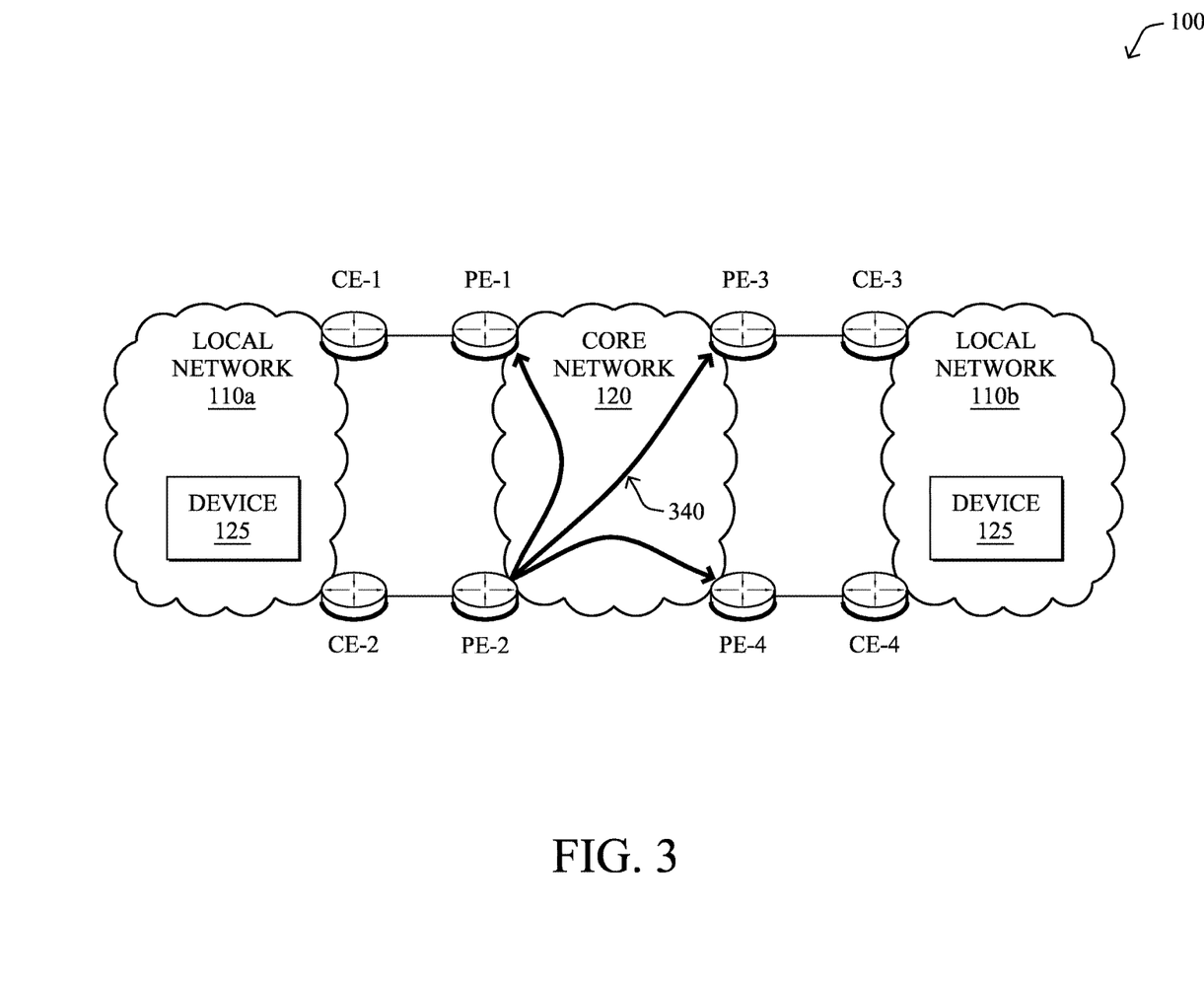
FIG. 3 illustrates an example of receiver-signaled entropy labels.

Operationally, receiving routers advertise a set of entropy label values it is willing to receive using, for example, the Interior Gateway Protocol (IGP) or internal (or interior) Border Gateway Protocol (iBGP) routing protocols. For example, as shown in FIG. 3, each PE device in the core network 120 (or any edge router/device in any type of network) may advertise its selected set of entropy labels 340 to each other PE device, such as shown with reference to PE2 advertising its labels 340 to PE1, PE3, and PE4, accordingly. Alternatively, in one or more embodiments, entropy labels may be based on management/administrator configuration, configuration via a software defined network (SDN) type of operation (e.g., a path computation element or "PCE"), or via targeted label distribution protocol (LDP) configuration, or some other flow between a sender and receiver such as an operations, administration, and management (OAM) flow. Notably, the entropy labels may be a range of labels, a set of ranges, an explicit list of individual labels, and so on.

Figure 4A:
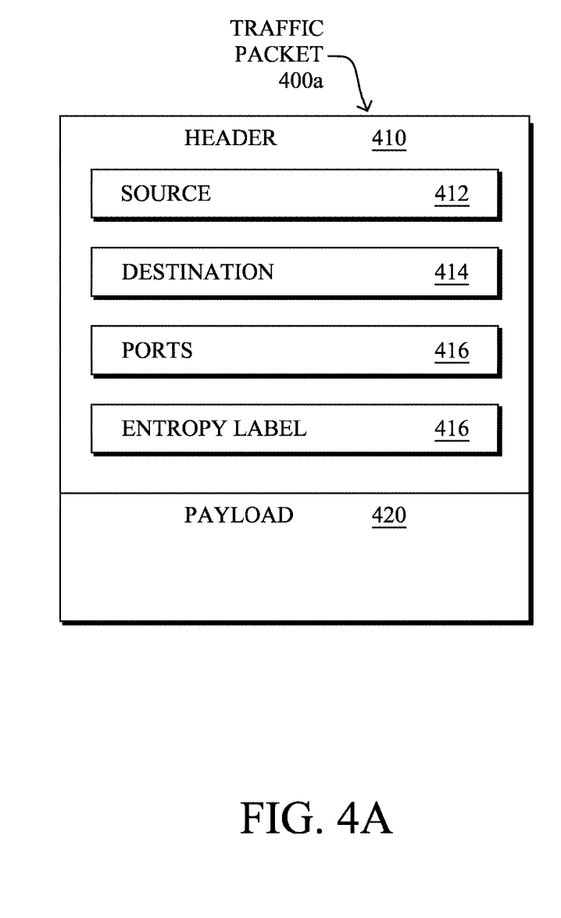
FIGS. 4A-4B illustrate examples of entropy labels in a packet format.
Figure 4B:
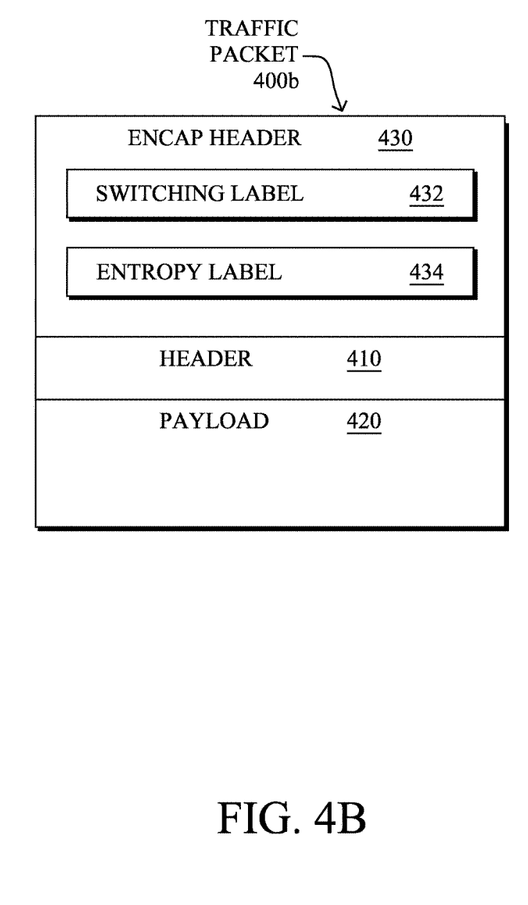

Sources wishing to add flow entropy may then choose a label from the set advertised by the target router (or otherwise configured) and may add that label to the forwarding-relevant fields in the packets 140. For instance, in one embodiment as shown in FIG. 4A, a packet format 400*a* may include a standard IP header 410 (e.g., with source address 412, destination address 414, ports 416, etc.), used to forward the payload 420. By adding the entropy label 418 to the IP header 410, routers within the network 120 may provide entropy-based forwarding according to the label 418, accordingly. In an more specific embodiment, as shown in FIG. 4B, an encapsulated packet format 400*b* (e.g., for MPLS) may include an encapsulation header 430 to encapsulate the header 410 and payload 420, where the encapsulation header comprises one or more switching labels 432 (e.g., for use by label-switching routers, LSRs). By adding the entropy label 418 to the label stack of the encapsulation header 430, LSRs within the network 120 may again provide entropy-based forwarding according to the label 418.

Figure 5:
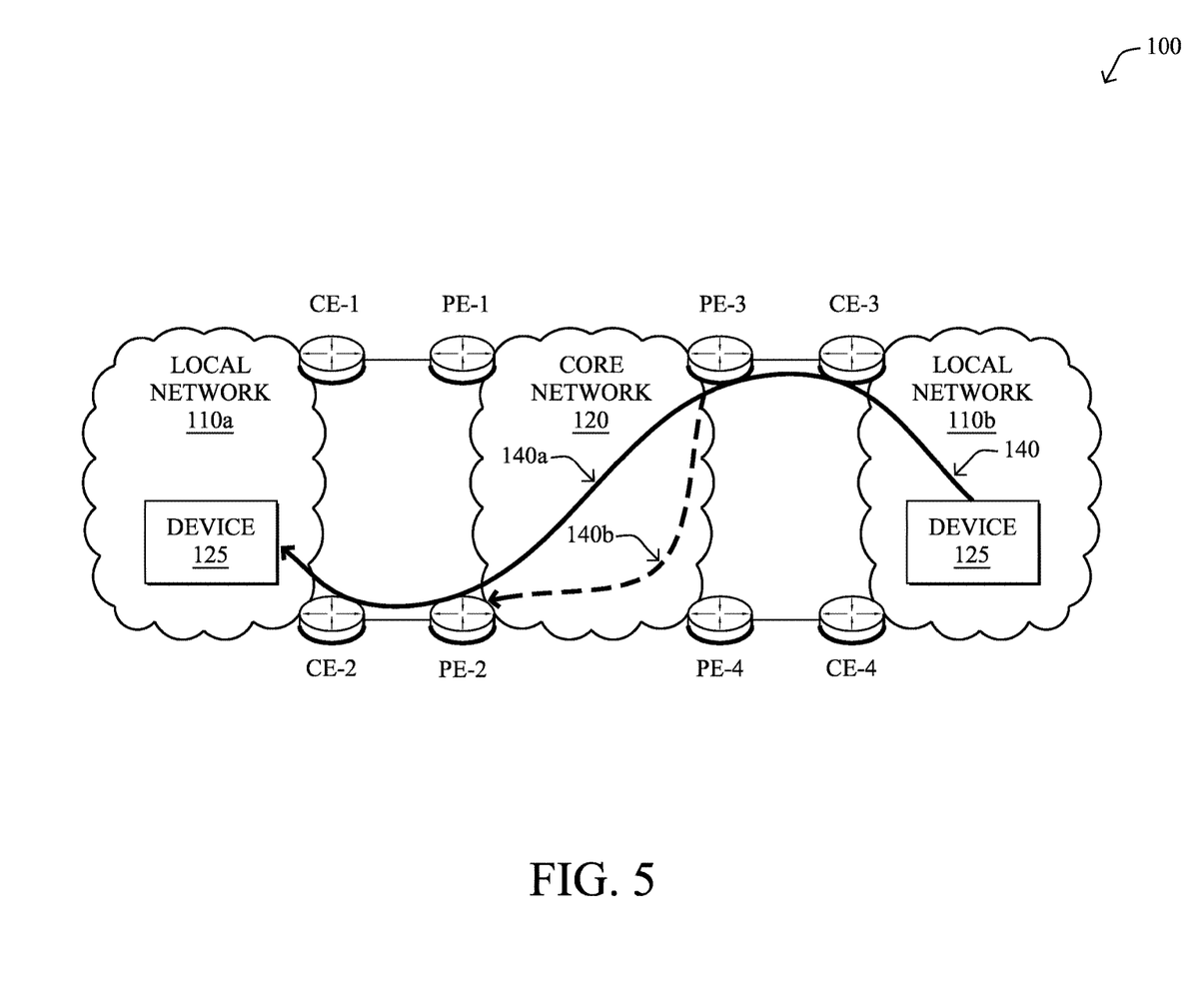
FIG. 5 illustrates an example of forwarding based on entropy labels.

The typical environment for this solution is a service provider core network 120 using MPLS-based forwarding (e.g., the specific, yet non-limiting example of FIG. 4B). As mentioned, each Provider Edge (PE) router that is capable of processing entropy labels advertises a set of such label values to all other routers using, for example, iBGP. Thus, as shown in FIG. 5, when a source PE (e.g., PE3) illustratively pushes an MPLS label stack onto a packet (of flow 140) destined to a particular destination PE (e.g., PE2), it can optionally include an entropy label in the stack, the value of which is in the set of permissible entropy label values signaled by that destination PE. According to entropy-based forwarding with in the core network 120, the flow of packets may follow different paths (e.g., packets 140*a* and 140*b*, assuming two paths) to reach the intended receiver.

Notably, this solution to the entropy label signaling problem may be used provides less scope for entropy than source-based entropy label selection in the sense that source-based selection gives the source router 20 bits of "entropy freedom" (e.g., allowing the source router to select any entropy label that would fit within a designated field size), whereas the techniques herein limit the source to choosing a label within the set advertised by the destination; the entropy scope is proportional to the set size. In practice, modest set sizes are expected to provide sufficient entropy to exercise the ECMP alternatives that exist in operational networks.

Figure 6:
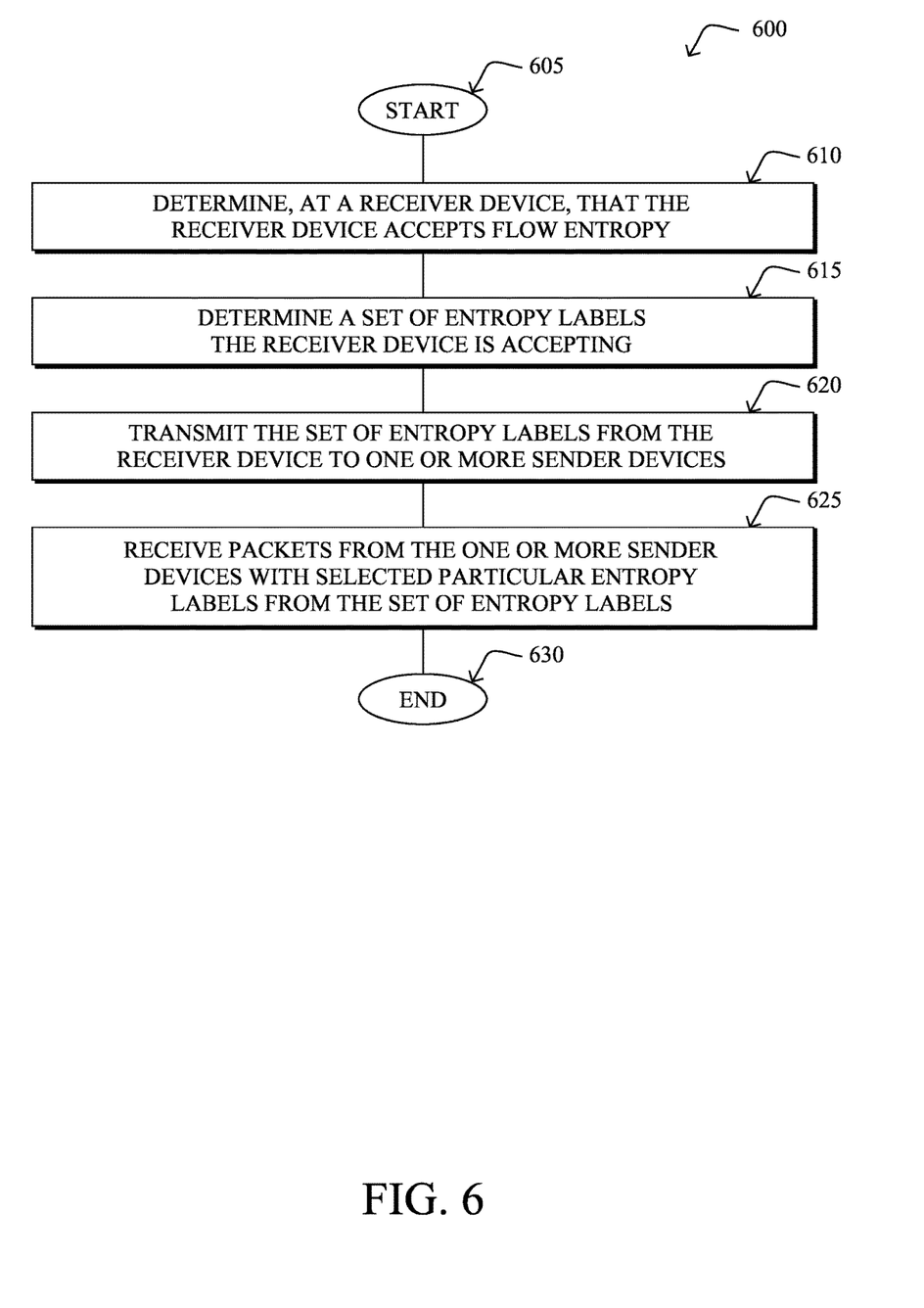
FIG. 6 illustrates an example simplified procedure for receiver-signaled entropy labels for traffic forwarding in computer networks, particularly from the perspective of the receiver.

FIG. 6 illustrates an example simplified procedure 600 for receiver-signaled entropy labels for traffic forwarding in computer networks in accordance with one or more embodiments described herein, particularly from the perspective of the receiver. The procedure 600 may start at step 605, and continues to step 610, where, as described in greater detail above, at a receiver device (e.g., PE2), determines that it accepts flow entropy, and as such, in step 615 determines a set of entropy labels the receiver device is accepting (e.g., a range, set of ranges, explicit labels, etc.). Note that in certain embodiments, the set of entropy labels may be specific per sender device in the network.

In step 620, the receiver device transmits the set of entropy labels to one or more sender devices (e.g., PE1, PE3, and PE4), such as by advertising the set of entropy labels via a routing protocol (e.g., IGP, iBGP, etc.), communicating an OAM flow, etc. Accordingly, the receiver may then begin receiving packets from the one or more sender devices with selected particular entropy labels from the set of entropy labels in step 625. The procedure 600 illustratively ends at step 630, though may continue to update entropy labels and/or receive further packets, as mentioned above.

Figure 7:
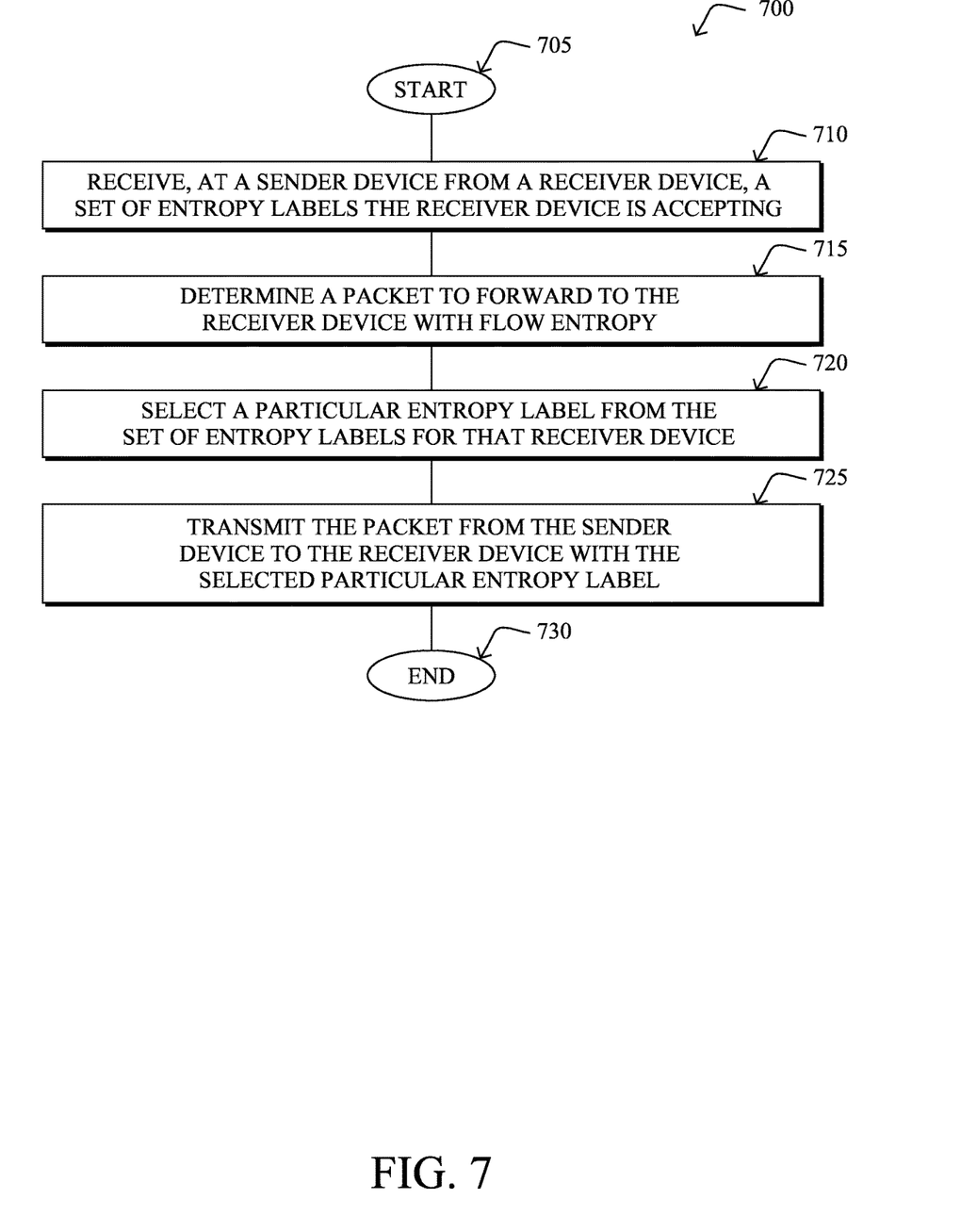
FIG. 7 illustrates another example simplified procedure for receiver-signaled entropy labels for traffic forwarding in computer networks, particularly from the perspective of the sender.

In addition, FIG. 7 illustrates another example simplified procedure 700 for receiver-signaled entropy labels for traffic forwarding in computer networks in accordance with one or more embodiments described herein, particularly from the perspective of the sender. The procedure 700 may start at step 705, and continues to step 710, where, as described in greater detail above, the sender device (e.g., PE3) receives from a receiver device (e.g., PE2) a set of entropy labels the receiver device is accepting (e.g., via a routing protocol, such as IGP, iBGP, etc., or else through other configuration, as noted above). In response to later determining a packet to forward to the receiver device with flow entropy in step 715, the sender device may then select a particular entropy label from the set of entropy labels for that receiver device in step 720, and transmits the packet to the receiver device with the selected particular entropy label in step 725. The network 120 may then perform entropy-based forwarding of the packet to reach the receiver device, accordingly, and the procedure 700 illustratively ends in step 730 until receiving updated entropy labels or additional packets for flow entropy.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for receiver-signaled entropy labels for traffic forwarding in computer networks. In particular, the techniques herein enhance entropy label signaling, and has two principal advantages over currently proposed solutions. First, the techniques herein obviate the need for a separate "Entropy Label Indicator" (ELI) label which is otherwise required when the entropy label cannot be identified by stack position alone (much of the text in the current IETF draft noted above concerns the mechanics of stack position and ELI signaling and use; none of this is necessary with the solution proposed herein). Second, by reducing the number of possible entropy label values to a small set, the techniques herein reduce the number of entropy labels that are required to ensure that every path through the network that is viable from the ingress PE to the egress PE can be tested (e.g., for operations, administration, and management (OAM) measurements such as loss-delay). Third, performing ECMP on the basis of deep packet inspecting (DPI) and getting OAM messages to follow the exact path of the data is significantly more difficult than the techniques herein which perform ECMP based on an entropy label where the value of the entropy label is known.

While there have been shown and described illustrative embodiments that provide for receiver-signaled entropy labels for traffic forwarding in computer networks, it is to be understood that various other adaptations and modifications may be made within the spirit and scope of the embodiments herein. For example, the embodiments have been shown and described herein with relation to particular network orientations (e.g., provider networks) and protocols (e.g., MPLS). However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a sender device from a receiver device, an advertisement, the advertisement including a set of entropy labels the receiver device is willing to process, wherein the sender device is an edge device in a core network and the set of entropy labels is sent to each edge router in the core network and the receiver device is an edge device in the core network, wherein the set of entropy labels are a set of random labels that facilitate load balancing in the core network by allowing the sender device to tag different flows with different entropy label values of the set of entropy label values, resulting in different label stacks for different flows;
   receiving, at the sender device, a packet from a device in a local network to be forwarded to the receiver device with flow entropy;
   in response to receiving the packet, selecting, by the sender device, a particular entropy label from the set of entropy labels in the advertisement for that receiver device to be inserted into the packet during forwarding, wherein the particular entropy label is one of the entropy labels that receiver is willing to process; and
   transmitting the packet from the sender device to the receiver device with the selected particular entropy label.

2. The method as in claim 1, wherein receiving the set of entropy labels comprises:
   receiving the set of entropy labels via a routing protocol.

3. The method as in claim 1, wherein receiving the set of entropy labels comprises:
   receiving the set of entropy labels via configuration.

4. The method as in claim 1, wherein the sender device and receiver device are ingress and egress provider edge (PE) devices, respectively.

5. The method as in claim 1, wherein transmitting comprises:
   forwarding the packet according to Multi-Protocol Label Switching (MPLS).

6. The method as in claim 1, wherein the entropy label in the transmitted packet is an entry within a label stack.

7. A method, comprising:
   determining, at a receiver device, that the receiver device accepts flow entropy;
   determining, at the receiver device, a set of entropy labels the receiver device is willing to process;
   transmitting an advertisement from the receiver device to one or more sender devices, the advertisement including the set of entropy labels the receiver device is willing to process, wherein the one or more sender devices are edge devices in a core network and the set of entropy labels are transmitted to each edge device in the core network, and the receiver device is an edge device in the core network, wherein the set of entropy labels are a set of random labels that facilitate load balancing in the core network by allowing the one or more sender devices to tag different flows with different entropy label values of the set of entropy label values, resulting in different label stacks for different flows; and
   receiving, at the receiver device, packets from the one or more sender devices with selected particular entropy labels that are selected from the set of entropy labels included in the advertisement, wherein the packets are packets received at the sender devices from one or more devices in a local network.

8. The method as in claim 7, wherein the set of entropy labels are specific per sender device.

9. The method as in claim 7, wherein transmitting the set of entropy labels comprises:
   advertising the set of entropy labels via a routing protocol.

10. The method as in claim 7, wherein the transmitting the set of entropy labels comprises:
    communicating the set of entropy labels within an operations, administration, and management (OAM) flow.

11. The method as in claim 7, wherein the one or more sender devices and receiver device are ingress and egress provider edge (PE) devices, respectively.

12. The method as in claim 7, wherein receiving comprises:
    receiving the packets according to Multi-Protocol Label Switching (MPLS).

13. The method as in claim 7, wherein the entropy label in the received packets is an entry within a label stack.

14. An apparatus, comprising:
    one or more network interfaces to communicate with a computer network;
    a processor coupled to the network interfaces and adapted to execute one or more processes; and
    a memory configured to store a process executable by the processor, the process when executed operable to:
        receive, as a sender device from a receiver device, an advertisement, the advertisement including a set of entropy labels the receiver device is willing to process, wherein the sender device is an edge device in a core network and the set of entropy labels is sent to each edge router in the core network and the receiver device is an edge device in the core network, wherein the set of entropy labels are a set of random labels that facilitate load balancing in the core network by allowing the sender device to tag different flows with different entropy label values of the set of entropy label values, resulting in different label stacks for different flows;

receive a packet from a device in a local network to be forwarded to the receiver device with flow entropy;

in response to receiving the packet, select a particular entropy label from the set of entropy labels in the advertisement for that receiver device to be inserted into the packet during forwarding, wherein the particular entropy label is one of the entropy labels that receiver is willing to process; and transmit the packet to the receiver device with the selected particular entropy label.

15. The apparatus as in claim 14, wherein the process when executed to receive the set of entropy labels is further operable to:

receive the set of entropy labels via a routing protocol.

16. The apparatus as in claim 14, wherein the process when executed to transmit is further operable to:

forward the packet according to Multi-Protocol Label Switching (MPLS).

17. An apparatus, comprising:

one or more network interfaces to communicate with a computer network;

a processor coupled to the network interfaces and adapted to execute one or more processes; and a memory configured to store a process executable by the processor, the process when executed operable to:

determine, as a receiver device, that the receiver device accepts flow entropy;

determine a set of entropy labels the receiver device is willing to process;

transmit an advertisement from the receiver device to one or more sender devices, the advertisement including the set of entropy labels the receiver device is willing to process, wherein the one or more sender devices are edge devices in the computer network and the set of entropy labels are transmitted to each edge device in the computer network, and the receiver device is an edge device in the core network, wherein the set of entropy labels are a set of random labels that facilitate load balancing in the core network by allowing the one or more sender devices to tag different flows with different entropy label values of the set of entropy label values, resulting in different label stacks for different flows; and receive packets from the one or more sender devices with selected particular entropy labels that are selected from the set of entropy labels included in the advertisement, wherein the packets are packets received at the sender devices from one or more devices in a local network.

18. The apparatus as in claim 17, wherein the set of entropy labels are specific per sender device.

19. The apparatus as in claim 17, wherein the process when executed to transmit the set of entropy labels is further operable to:

advertise the set of entropy labels via a routing protocol.

20. The apparatus as in claim 17, wherein the process when executed to receive is further operable to:

receive the packet according to Multi-Protocol Label Switching (MPLS).

* * * * *